(12) United States Patent
Kogetsu et al.

(10) Patent No.: US 8,236,454 B2
(45) Date of Patent: Aug. 7, 2012

(54) NEGATIVE ELECTRODE FOR LITHIUM ION SECONDARY BATTERY AND LITHIUM ION SECONDARY BATTERY INCLUDING THE SAME

(75) Inventors: Yasutaka Kogetsu, Osaka (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 1173 days.

(21) Appl. No.: 11/898,695

(22) Filed: Sep. 14, 2007

(65) Prior Publication Data

US 2008/0070112 A1 Mar. 20, 2008

(30) Foreign Application Priority Data

Sep. 14, 2006 (JP) .................... 2006-249452

(51) Int. Cl.
- H01M 4/02 (2006.01)
- H01M 4/13 (2010.01)
- H01M 4/64 (2006.01)
- H01M 4/72 (2006.01)
- H01M 4/76 (2006.01)

(52) U.S. Cl. ............... 429/238; 429/209; 429/233
(58) Field of Classification Search ............ 429/245
See application file for complete search history.

(56) References Cited

U.S. PATENT DOCUMENTS

| 2002/0192564 A1 * | 12/2002 | Ota et al. .......... 429/324 |
| 2003/0027050 A1 | 2/2003 | Okamoto et al. |
| 2007/0178379 A1 | 8/2007 | Tamura et al. |

FOREIGN PATENT DOCUMENTS

| JP | 2002-319408 | 10/2002 |
| JP | 2002-319431 | 10/2002 |
| JP | 2005-196970 | 7/2005 |
| KR | 2006-0037836 | 5/2006 |
| WO | WO 01/29912 A1 | 4/2001 |
| WO | WO 2006/030681 A1 | 3/2006 |

OTHER PUBLICATIONS

Chinese Office Action issued in Chinese Patent Application No. CN 2007101527106 dated on Dec. 5, 2008.
Korean Office Action issued in Korean Patent Application No. KR 10-2007-0093672 dated Dec. 24, 2008.

* cited by examiner

Primary Examiner — Barbara Gilliam
Assistant Examiner — Steven Scully
(74) Attorney, Agent, or Firm — McDermott Will & Emery LLP

(57) ABSTRACT

A negative electrode for a lithium ion secondary battery of the present invention includes a sheet-like current collector and an active material layer carried on the current collector. The current collector includes a substrate and a surface portion that undergoes plastic deformation more easily than the substrate. The surface portion has protrusions and recesses. The active material layer includes a plurality of columnar particles containing silicon. The columnar particles are carried on the surface portion.

19 Claims, 9 Drawing Sheets

F I G. 1
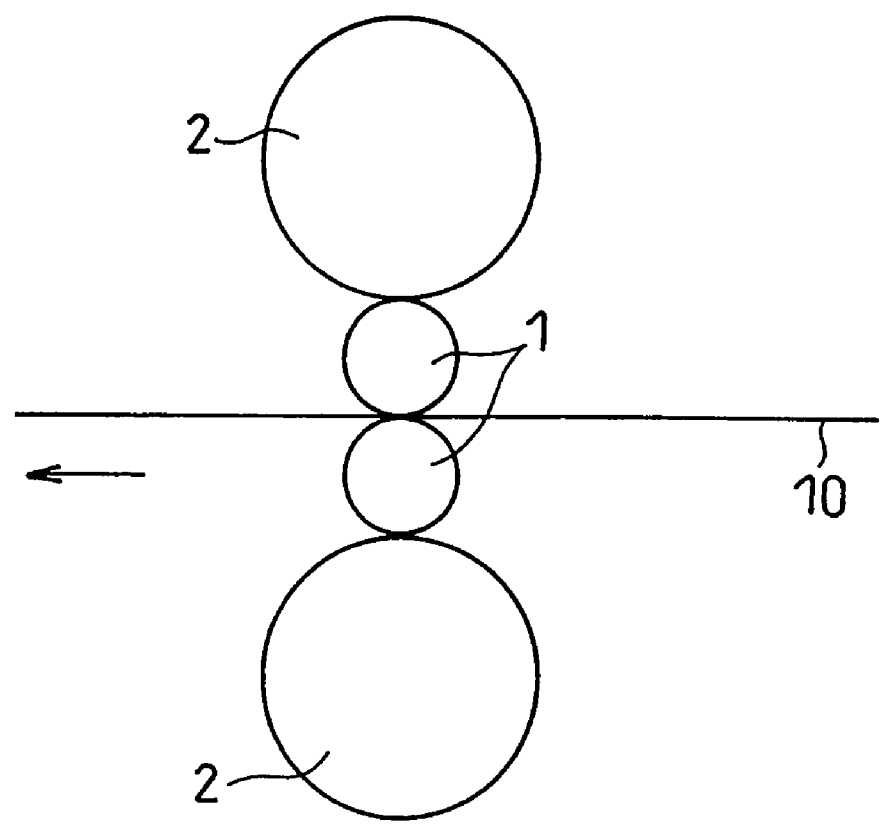

F I G. 6
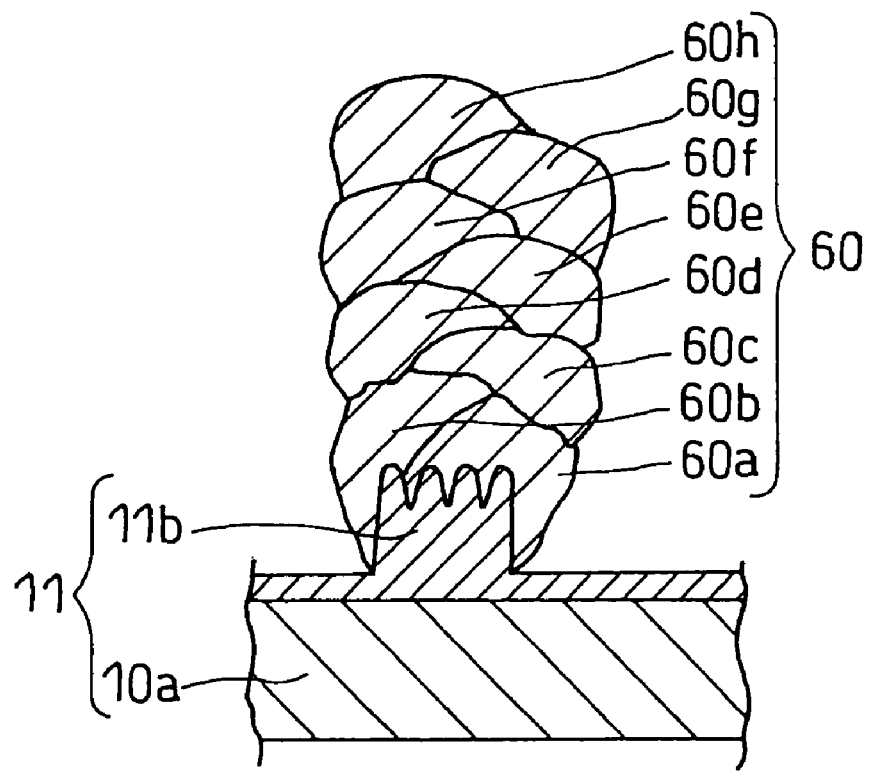

NEGATIVE ELECTRODE FOR LITHIUM ION SECONDARY BATTERY AND LITHIUM ION SECONDARY BATTERY INCLUDING THE SAME

FIELD OF THE INVENTION

The present invention relates to a negative electrode for a lithium ion secondary battery including a negative electrode active material containing silicon, and a lithium ion secondary battery including the same, and more particularly to an improved current collector for use in a negative electrode.

BACKGROUND OF THE INVENTION

With the development of portable devices such as personal computers and cell phones in recent years, demand is increasing for batteries for use as a power source for the devices. The batteries for such an application are required to operate at room temperature as well as to have a high energy density and excellent cycle characteristics.

To satisfy this demand, batteries including, as a negative electrode active material, a simple substance, oxide or alloy of silicon (Si) or tin (Sn), which can provide a very high capacity, are regarded as promising candidates.

However, the negative electrode active materials as described above undergo a change in crystal structure upon absorption of lithium, and their volumes increase. If the volume change of the active material is large, insufficient contact occurs between the active material and the current collector, resulting in a short charge/discharge cycle life.

In order to solve this problem, Japanese patent No. 3733065 (Document 1) proposes to form a thin film of silicon on a roughened surface of a current collector.

However, in the negative electrode of Document 1, because no space is present within the Si thin film, when the active material expands during charge, a large amount of stress acts on the Si thin film, causing the Si thin film to detach from the current collector, or causing the electrode plate to deform.

In view of the above, it is an object of the present invention to provide a negative electrode with which a lithium ion secondary battery having excellent cycle characteristics can be obtained even when an active material that exhibits a significant volume change during charge/discharge is used, and to provide a lithium ion secondary battery including the negative electrode.

BRIEF SUMMARY OF THE INVENTION

The negative electrode for a lithium ion secondary battery of the present invention includes a sheet-like current collector and an active material layer carried on the current collector. The current collector includes a substrate and a surface portion that undergoes plastic deformation more easily than the substrate, and the surface portion has protrusions and recesses. The active material layer includes a plurality of columnar particles containing silicon, and the columnar particles are carried on the surface portion.

According to a preferable embodiment of the present invention, the surface portion has a hardness lower than that of the substrate. For example, by incorporating copper into the substrate and the surface portion such that the concentration of copper contained in the surface portion is higher than that of copper contained in the substrate, the hardness of the surface portion can be reduced to a hardness lower than that of the substrate.

This surface portion may be a copper foil of high purity attached by pressure onto the surface of the substrate, or may be formed by plating the surface of the substrate with copper, or may be formed by vapor deposition of copper on the surface of the substrate.

According to another preferable embodiment of the present invention, the surface portion is porous. The porous surface portion may be formed by etching the substrate, or may be formed by electrodeposition of copper on the surface of the substrate.

According to still another preferable embodiment of the present invention, the surface portion is porous, and at the same time, the substrate and the surface portion contain copper, and the concentration of copper contained in the surface portion is higher than that of copper contained in the substrate.

It is preferable that the columnar particles each are made up of a laminate of a plurality of sub-particle layers (grain layers) that is grown and inclined with respect to a normal line direction of the surface of the current collector. It is more preferable that the growth directions of the plurality of sub-particle layers included in the laminate are inclined alternately in a first direction and a second direction with respect to the normal line direction of the surface of the current collector.

The present invention further relates to lithium ion secondary battery including: an electrode group having a positive electrode capable of absorbing and desorbing lithium ions, the above-described negative electrode, and a separator disposed between the positive electrode and the negative electrode; an electrolyte having lithium ion conductivity; and a battery case that houses the electrode group and the electrolyte.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a schematic diagram of an example of an apparatus for forming protrusions and recesses on a surface portion.

FIG. 6 is a diagram schematically showing a columnar particle included in a negative electrode for a lithium secondary battery according to another embodiment of the present invention.

DETAILED DESCRIPTION OF THE INVENTION

Figure 2:
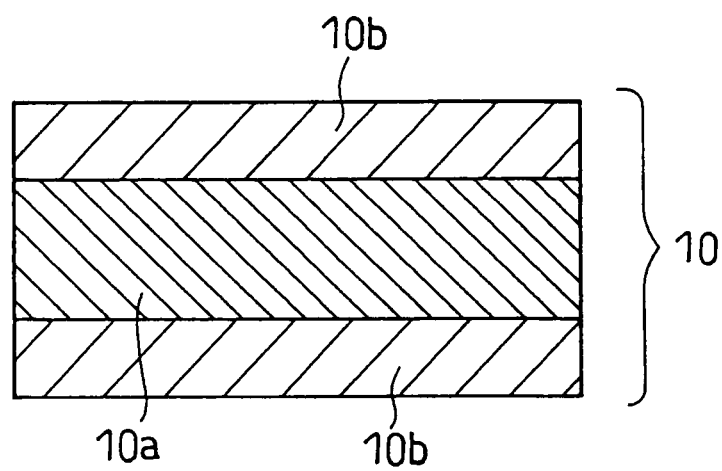
FIG. 2 is a vertical cross-sectional view schematically showing an example of a negative electrode current collector precursor before forming protrusions and recesses on the surface portion.

The negative electrode for a lithium ion secondary battery of the present invention includes a sheet-like current collector and an active material layer carried on the current collector. The current collector includes a substrate and a surface portion that undergoes plastic deformation more easily than the substrate. The surface portion has protrusions and recesses. The active material layer includes a plurality of columnar particles containing silicon, and the columnar particles are carried on the surface portion.

In the above-described negative electrode for a lithium ion secondary battery, the current collector has the surface portion that undergoes plastic deformation more easily than the substrate. This surface portion, when stress is applied thereto, deforms easily. Accordingly, for example, by applying a mechanical stress on the current collector surface, protrusions and recesses having desired sizes can be easily formed on the surface of the current collector. For example, by applying pressure onto the current collector using a mold in which protrusions and recesses are arranged regularly on the surface thereof, protrusions and recesses can be formed easily on the current collector surface.

If the surface portion is a layer that is difficult to undergo plastic deformation or a rigid layer, a significant amount of stress is required to form protrusions and recesses on the current collector surface. This requires an additional production apparatus for applying such a significant amount of stress, which increases the cost or decreases the production efficiency. Moreover, even if a significant amount of stress is applied onto the current collector, the current collector may be broken.

For example, by making the hardness of the surface portion lower than that of the substrate, the surface portion can be made to undergo plastic deformation more easily than the substrate. In order to make the surface portion to easily undergo plastic deformation, it is preferable that the surface portion has a Vickers hardness of 200 or lower, and more preferably 160 or lower.

The Vickers hardness can be measured according to JIS Z2244.

An example of the surface portion having a Vickers hardness of 200 or lower is a layer of high purity copper. It is preferable that the layer of high purity copper has a copper content of 99.9 wt % or greater.

As described above, when the surface portion has a hardness lower than that of the substrate, that is, when the substrate has a hardness higher than that of the surface portion, it is also possible to prevent the entire current collector from being contorted or undulated when forming protrusions and recesses on the current collector surface. Such contortions and undulations of the current collector tend to occur easily when forming protrusions and recesses simultaneously on both surfaces of the current collector.

If the entire current collector is contorted, or undulations occur in the current collector, it will be difficult to form an electrode group by spirally winding the negative electrode, a separator and a positive electrode. In addition, unwanted space is created in the electrode group, and thus the capacity of the lithium ion secondary battery decreases.

It is also possible to make the surface portion to undergo plastic deformation more easily than the substrate by allowing the surface portion to be porous. In this case also, the surface portion preferably has a Vickers hardness of 200 or lower, and more preferably 160 or lower. Even when the surface portion is made of a material having a high hardness, by allowing the surface portion to be porous, the hardness of the surface portion can be reduced, so the surface portion can undergo plastic deformation easily.

The porosity of the surface portion is adjusted so as to reduce the Vickers hardness.

When the surface portion is porous, it is preferable that the surface portion before forming protrusions and recesses has a surface roughness Ra of not less than 0.5 µm and not greater than 10 µm. The surface roughness Ra can be measured according to JIS B0601-1994.

The porous surface portion can be produced by, for example, anisotropically etching the surface of the substrate. By forming a plurality of pores in the surface of the substrate by etching as described above, it is possible to form a surface portion having a low Vickers hardness.

It is also possible to form a porous surface portion with a large number of deposited metal particles. Such a porous surface portion can be produced by forming a large number of metal particles on the surface of the substrate by electrodeposition.

In the present invention, "electrodeposition" refers to a process in which a large number of metal particles having a predetermined size are grown by using a electrolyte containing predetermined metal ions and a current density higher than that used in normal plating (e.g., current density equal to or greater than the limiting current density), and the metal particles are immobilized. The immobilization of the metal particles onto the substrate surface can be performed by, for example, performing plating such that a thin film made of a predetermined metal is formed on and around the metal particles.

With the electrodeposition as described above, for example, copper particles of high purity (with a copper content of 99.9 wt % or greater) can be formed on the surface of the substrate.

It is preferable that the formed metal particles have a median particle diameter of 1 to 10 µm. If the metal particles have a median particle diameter of less than 1 µm, the production of the surface portion will be difficult, increasing production cost. If the metal particles have a median particle diameter greater than 10 µm, the Vickers hardness of the surface portion cannot be made low. For this reason, the effect of enhancing the workability of the surface portion cannot be obtained sufficiently.

It is preferable that the average height difference between the protrusions and recesses (i.e., the average height of the protrusions) formed on the surface portion is 1 to 15 Mm, and more preferably 3 to 10 µm. By setting the average height difference between the protrusions and recesses to 1 µm or greater, the porosity of the active material layer is increased, enhancing the effect of releasing expansion of the active material. As a result, deformation of the electrode plate and detachment of the active material are suppressed, so cycle characteristics can be improved. If the average height difference between the protrusions and recesses is greater than 15 µm, the porosity of the active material layer will be too large, which may decrease the energy density of the negative electrode.

The average height difference between the protrusions and recesses is obtained as follows. The current collector is cut, and the cross section is observed by a scanning electron microscope (SEM). Then, the height difference of, for example, 2 to 10 protrusions and recesses is measured, and the obtained values are averaged. In other words, the average height difference between the protrusions and recesses is the average value of the heights extending from the undermost position of recesses to the uppermost position of protrusions in the normal line direction of the surface of the current collector.

The thickness of the surface portion depends on the average height difference between the formed protrusions and recesses, the arrangement of the protrusions and recesses, and the like. For example, the surface portion after protrusions and recesses are formed preferably has a thickness of 1 to 8 μm. In this case, the thickness of the surface portion refers to the shortest distance between the average position of the height of the protrusions and recesses and the substrate-side end of the surface portion. As used herein, "the average position of the height of the protrusions and recesses" refers to the position at the half of the average height difference between the protrusions and recesses.

The thickness of the surface portion can be determined in the same manner as described above using an SEM.

Preferably, the substrate has a Vickers hardness greater than 200, and more preferably 250 or greater. With the rigid substrate, it is possible to suppress deformation of the substrate that occurs when forming protrusions and recesses by plastically deforming the surface portion. Further, even when the active material expands, deformation of the electrode plate can be suppressed.

When the surface portion has a Vickers hardness much lower than 200, the Vickers hardness of the substrate may be about 200.

An example of the substrate having a Vickers hardness higher than 200 is a copper alloy foil obtained by adding an equal amount (0.2 wt %) of chromium, tin, zinc, silicon, nickel and the like to copper. It is also possible to use a copper alloy foil obtained by adding 0.05 to 0.2 wt % of tin to copper, a copper alloy foil obtained by adding 0.02 to 0.2 wt % of zirconium to copper, a copper alloy foil obtained by adding 1 to 4 wt % of titanium to copper, or a nickel foil.

When the surface portion has a low Vickers hardness, a stainless steel foil can be used as the substrate.

It is preferable that the difference between the Vickers hardness of the surface portion and that of the substrate is 30 or greater, and more preferably 50 or greater. This is because, when the hardness of the surface portion is relatively lower than that of the substrate, the substrate can be protected from deformation that occurs due to stress applied to plastically deform the surface portion.

The substrate preferably has a thickness of 8 to 30 μm. It is preferable that the thickness of the substrate is selected appropriately according to the thickness of the active material layer, the porosity of the active material layer, and the like. When the substrate has a thickness of 8 μm or greater, deformation of the current collector can be suppressed while retaining workability. When the substrate has a thickness greater than 30 μm, the substrate accounts for a large proportion of the volume of the battery, so a high capacity battery cannot be designed.

Also, it is preferable that the ratio of the thickness of the surface portion with protrusions and recesses to that of the substrate is 3 to 50% according to the above-described thickness range of the substrate.

As long as the substrate has a hardness higher than that of the surface portion, the substrate may be porous.

When the substrate is porous, it is preferable that the surface roughness Ra of the substrate is not less than 0.5 Mm and not greater than 10 Mm.

In the present invention, it is preferable that the substrate and the surface portion that form the current collector include copper, and the concentration of copper contained in the surface portion is higher than that of copper contained in the substrate. Such a current collector can be formed with, for example, a rigid substrate made of a copper alloy as described above and a surface portion made of a copper material having a copper content higher than the copper alloy that forms the substrate. As the copper material having a high copper content, similarly to the above, a copper foil having a copper content of 99.9 wt % or greater can be used.

Such a current collector can be formed by, for example, laminating the rigid copper foil (substrate) made of a copper alloy described above and the copper foil (surface portion) having a purity higher than that of the rigid copper foil. When forming protrusions and recesses on the copper foil having a high purity, the rigid copper foil and the copper foil can be attached to each other by pressure. Accordingly, the current collector configured as above can be produced without the use of an adhesive.

The surface portion made of a copper material having a high copper content can be formed by plating the surface of the substrate with copper. As the plating method, a plating method that uses a copper sulfate bath, copper fluoroborate bath, copper cyanide bath, copper pyrophosphate bath or the like can be used. Particularly, in a plating method using a copper sulfate bath, by setting the current density to a high level, a copper layer having a low density, a low Vickers hardness and excellent workability can be formed. For this reason, when producing the surface portion made of high purity copper by a plating method, it is preferable to use a plating method that uses a copper sulfate bath.

It is also possible to form a surface portion made of a copper material having a high copper content by vapor deposition of copper on the surface of the substrate. As the vapor deposition source used in the vapor deposition, it is preferable to use a copper material having a copper content of 99.9 wt % or greater. The vapor deposition source can be heated by various methods. Examples of the heating method include resistance heating, induction heating and electron beam heating.

Furthermore, in the present invention, when the surface portion is porous, and at the same time, the substrate and the surface portion contain copper, by making the concentration of copper contained in the surface portion higher than that of copper contained in the substrate, the surface portion can be made to undergo plastic deformation more easily than the substrate.

The porous surface portion formed of a copper material having a high copper content can be produced by, for example, in the same manner as described above, laminating a substrate containing copper and a copper foil containing copper at a higher purity than that of the substrate, and etching the copper foil of higher copper purity. Instead of laminating the substrate and the copper foil of higher copper purity, it is also possible to form, on the substrate, a layer containing copper at a higher purity than that of the substrate by plating or vapor deposition, and then etching the layer of higher copper purity.

Alternatively, by electrodeposition of copper, the porous surface portion of higher copper purity than that of the substrate can be formed on the surface of the substrate.

The active material layer includes a plurality of columnar particles containing silicon formed on the surface portion having protrusions and recesses.

In the case where the surface of the current collector has protrusions and recesses, when the active material is deposited on the current collector, the active material is carried mainly by the protrusions formed on the current collector, and thus a plurality of columnar active material particles are formed on the surface of the current collector. In other words, the columnar particles are spaced apart from each other, so a gap exists between the columnar particles. This relieves the stress caused by expansion of the columnar particles, which are the active material, during charge, thereby suppressing the columnar particles from detaching from the current collector and also suppressing the deformation of the electrode plate. Accordingly, the current collecting ability of the active material is insured, and a uniform electrode reaction can be maintained, and thus a battery having excellent cycle characteristics can be obtained.

As described above, the negative electrode active material particles contain silicon. Examples of the negative electrode active material particles include a silicon simple substance, a silicon oxide ($SiO_x$), a silicon alloy and a silicon compound. Such negative electrode active materials exhibit a high capacity.

Examples of the silicon alloy include a Si—Ti based alloy and a Si—Cu based alloy.

An example of the silicon compound is a silicon nitride ($SiN_x$).

The negative electrode active material layer preferably has a porosity of 10 to 70%, and more preferably 30 to 60%. When the active material layer has a porosity of 10% or greater, the effect of relieving expansion of the active material layer can be obtained. If the porosity exceeds 70%, the negative electrode active material layer can be used as a negative electrode without any problems depending on the application of the battery, but the energy density of the negative electrode will be small.

The porosity of the negative electrode active material layer can be calculated from the weight, thickness and active material density of a defined area of the active material layer. The porosity (%) can be determined by the expression: 100-[{ST−(W/D)}/ST], where T is the thickness of a defined area S of active material layer, W is the weight of the active material layer, and D is the active material density.

The porosity of the negative electrode active material layer can be controlled by, for example, adjusting the height difference of the protrusions and recesses formed on the surface of the negative electrode current collector, the distance between the protrusions, and the like. When the growth direction of the columnar active material particles is inclined with respect to the normal line direction of the surface of the current collector, by further adjusting the angle between the growth direction of the columnar particles and the normal line direction of the surface of the current collector, the porosity of the negative electrode active material layer can be controlled. Although the surface of the current collector has protrusions and recesses, when observed visually, the surface of the current collector appear to be flat, so the normal line direction of the current collector can be determined uniquely.

The distance between adjacent protrusions preferably is 5 to 50 Mm, and more preferably 10 to 40 μm. As used herein, "the distance between adjacent protrusions" refers to a distance between the center of gravity of the contour of a protrusion and the center of gravity of the contour of an adjacent protrusion when viewed from the normal line direction of the surface of the current collector. The contours of the protrusions when viewed from the normal line direction of the surface of the current collector can be confirmed by, for example, an electron microscope.

Figure 5:
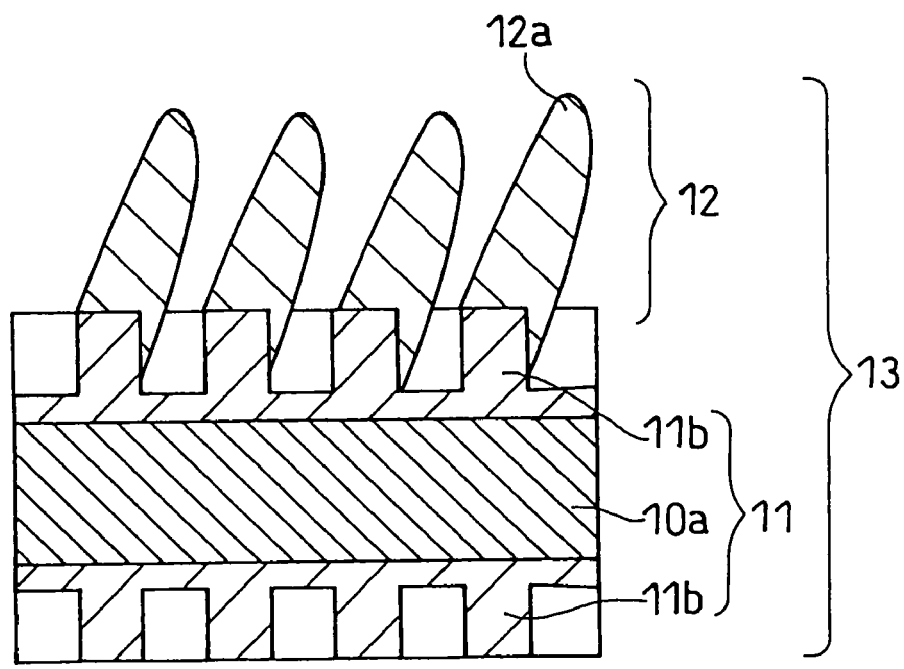
FIG. 5 is a vertical cross-sectional view schematically showing a negative electrode for a lithium ion secondary battery according to an embodiment of the present invention.

An example of a method for forming protrusions and recesses on the surface portion and an example of a method for producing the active material layer on the surface portion will be described below. The following description discusses the case of producing a negative electrode current collector in which the surface portion having protrusions and recesses is formed on each surface of the substrate, and then forming an active material layer containing a silicon oxide only on one surface portion as shown in FIG. 5.

For example, a current collector surface is pressed with a mold in which protrusions and recesses are arranged regularly on the surface, whereby the current collector surface can be processed to have a shape reflecting the protrusions and recesses of the mold. Also, by pressing the current collector with rotating rigid rollers in which protrusions and recesses are formed on the surfaces, protrusions and recesses can be formed continuously on a long current collector in an efficient manner.

Specifically, using an apparatus shown in FIG. 1, protrusions and recesses can be formed in the surface portion.

The apparatus of FIG. 1 includes two processing rollers 1 for forming protrusions and recesses and two backup rollers 2 for supporting the processing rollers. The surfaces of the processing rollers 1 for forming protrusions and recesses are made of a rigid material, and have regularly formed protrusions and recesses. An example of the processing rollers 1 is iron rollers in which a ceramic layer having regularly formed pores is formed on the surfaces. The ceramic layer can be formed by thermal-spraying ceramic such as chromium oxide onto the surface of an iron roller. The pores can be formed in the ceramic layer by laser processing.

A current collector precursor 10 including a substrate 10a and surface portions 10b that easily undergo plastic deformation as shown in FIG. 2 is introduced between two processing rollers 1. The surface portions 10b that easily undergo plastic deformation are formed on both surfaces of the substrate 10a.

Figure 3:
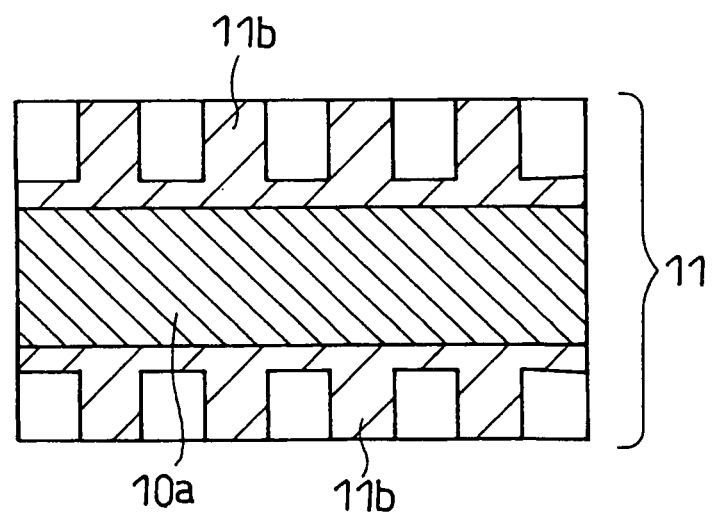
FIG. 3 is a vertical cross-sectional view schematically showing an example of a negative electrode current collector in which protrusions and recesses are formed on the surface portion.

The current collector precursor 10 is moved in a direction indicated by the arrow while pressed with the two processing rollers 1. In the present invention, because surface portions that easily undergo plastic deformation are formed on the surfaces of the current collector, it is possible to easily form a negative electrode current collector 11 including surface portions 11b having protrusions and recesses as shown in FIG. 3.

Figure 4:
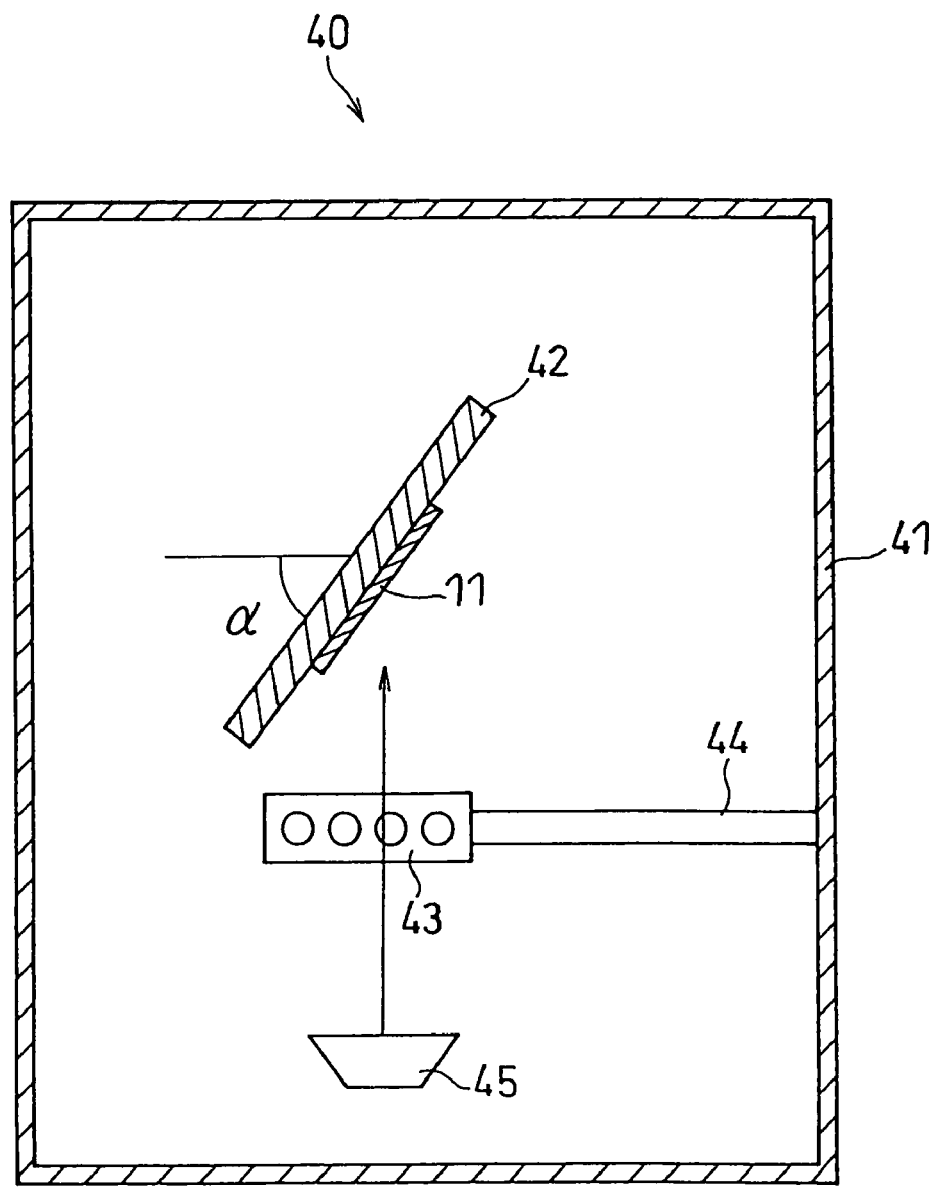
FIG. 4 is a schematic diagram of an example of an apparatus for forming a negative electrode active material layer.

The formation of the active material layer containing a silicon oxide onto the surface portion can be performed by using, for example, a vapor deposition apparatus 40 that includes an electron beam heater as shown in FIG. 4.

The vapor deposition apparatus 40 includes a pipe 44 for introducing an oxygen gas into a chamber 41, and nozzles 43. The nozzles 43 are connected to the pipe 44 inserted into the vacuum chamber 41. The pipe 44 is connected to an oxygen cylinder (not shown) through a mass flow controller (not shown).

A holding table 42 for fixing the negative electrode current collector 11 is disposed above the nozzles 43. A target 45 is disposed vertically below the holding table 42. Between the negative electrode current collector 11 and the target 45, an oxygen atmosphere consisting of an oxygen gas is present.

As the target 45, a silicon-containing material, for example, a silicon simple substance can be used.

The negative electrode current collector having protrusions and recesses as described above is fixed onto the holding table 42, and then the holding table 42 is inclined to form an angle α with respect to the horizontal plane.

In the case where a silicon simple substance is used as the target 45, upon irradiation of electron beams to the target 45, silicon atoms are evaporated from the target 45. The evaporated silicon atoms pass through the oxygen atmosphere and then deposit on the surface portion 11b of the current collector together with oxygen atoms. In this manner, an active material layer 12 including a silicon oxide is formed on the current collector. In the deposition, silicon atoms together with oxygen atoms are deposited intensively onto the protrusions on the current collector surface, so these atoms are hardly deposited in the recesses. For this reason, the active material layer 12 includes a plurality of columnar particles 12a containing a silicon oxide carried on the protrusions of the surface portion 11b.

In the above-described manner, a negative electrode 13 in which the active material layer 12 is formed only on one surface portion 11b as shown in FIG. 5 can be formed.

Figure 7:
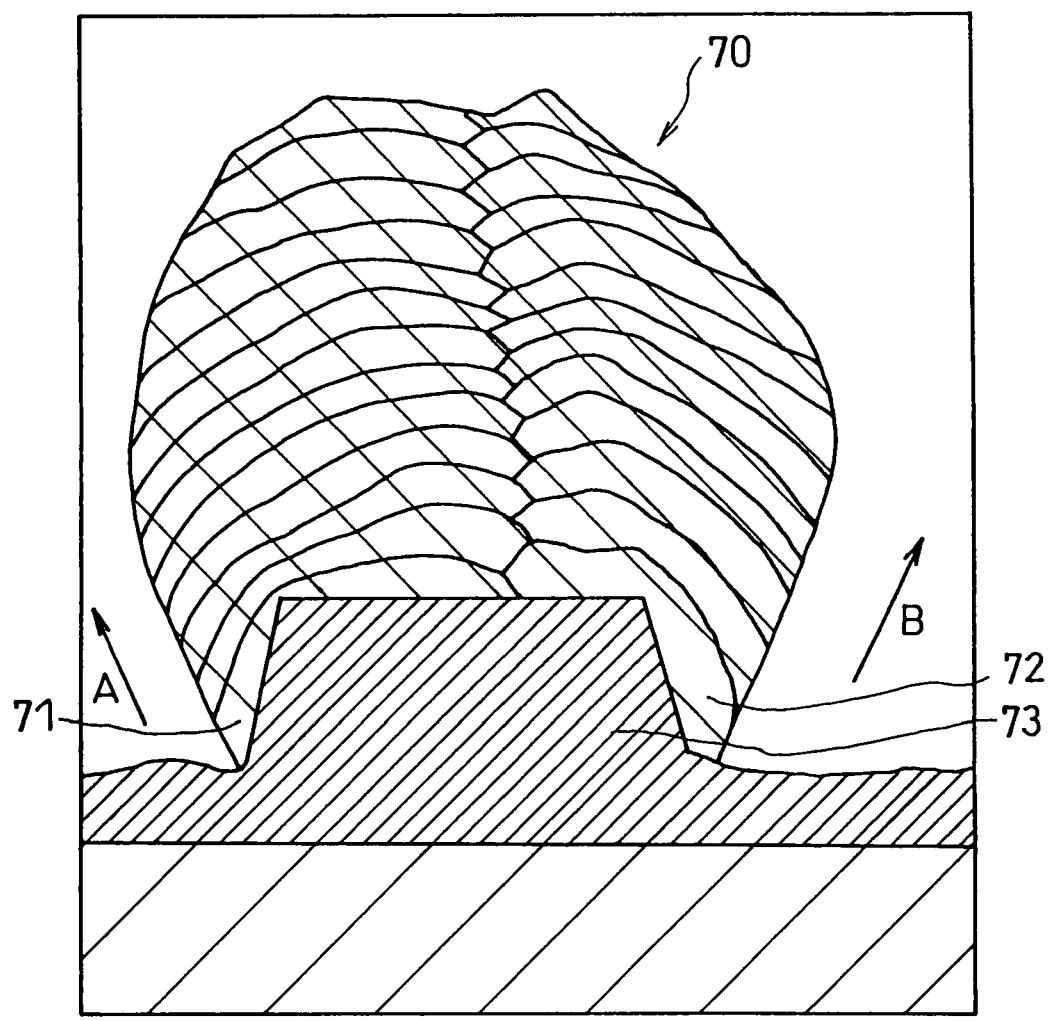
FIG. 7 is a diagram schematically showing a columnar particle included in a negative electrode for a lithium secondary battery according to still another embodiment of the present invention.

The columnar particles carried on the surface of the current collector each may be formed of a single particle as shown in FIG. 5, or may be formed of a laminate of a plurality of sub-particle layers as shown in FIGS. 6 and 7. The growth direction of the columnar particles may be inclined with respect to the normal line direction of the current collector surface as shown in FIG. 5, or may be parallel to the normal line direction of the current collector surface as shown in FIGS. 6 and 7.

FIGS. 6 and 7 schematically show active material particles included in a negative electrode for a lithium ion secondary battery according to another embodiment of the present invention. In FIGS. 6 and 7, the same reference numerals are given to the same components as those of FIG. 5. In FIG. 6, the upper surface of the protrusion has a predetermined surface roughness.

A columnar particle 60 of FIG. 6 has a laminate including eight sub-particle layers 60a, 60b, 60c, 60d, 60e, 60f, 60g and 60h. In this columnar particle of FIG. 6, the growth direction of the sub-particle layer 60a is inclined in a predetermined first direction with respect to the normal line direction of the current collector surface. The growth direction of the sub-particle layer 60b is inclined in a second direction that is different from the first direction with respect to the normal line direction of the current collector surface. Similarly to the above, the subsequent sub-particle layers included in the columnar particle 60 are inclined alternately in the first direction and the second direction with respect to the normal line direction of the current collector surface. By changing the growth directions of the sub-particle layers alternately in the first and the second direction when a plurality of sub-particle layers are laminated, an average growth direction of the columnar particle 60 as a whole can be aligned parallel to the normal line direction of the current collector surface.

Alternatively, as long as the growth direction of the columnar particle as a whole is parallel to the normal line direction of the current collector surface, the growth directions of the sub-particle layers may be inclined in different directions.

The columnar particle of FIG. 6 can be produced in the following manner, for example. First, the sub-particle layer 60a is formed such that it covers the top of a protrusion of the surface portion 11b and a part of the side face extending from the top. Subsequently, the sub-particle layer 60b is formed such that it covers the remaining part of the side face of the protrusion and a part of the top surface of the sub-particle layer 60a. Specifically, in FIG. 6, the sub-particle layer 60a is formed on one end of the protrusion of the surface portion 11b including the top, and the sub-particle layer 60b is formed such that a part of the sub-particle layer 60b overlaps the sub-particle layer 60a and the remaining part is formed on the other end of the protrusion. Further, the particle 60c is formed such that it covers the remaining part of the top surface of the sub-particle layer 60a and a part of the top surface of the sub-particle layer 60b. Specifically, the sub-particle layer 60c is formed such that it comes into contact mainly with the sub-particle layer 60a. Further, the sub-particle layer 60d is formed such that it comes into contact mainly with the sub-particle layer 60b. In the same manner as above, by alternately laminating the subsequent sub-particle layers 60e, 60f, 60g and 60h, the columnar particle as shown in FIG. 6 is formed.

A columnar particle 70 of FIG. 7 has a plurality of first sub-particle layers 71 and a plurality of second sub-particle layers 72.

Each sub-particle layer of the columnar particle of FIG. 7 has a thickness smaller than that of each sub-particle layer of the columnar particle of FIG. 6. The columnar particle of FIG. 7 has a smoother contour than that of the columnar particle of FIG. 6

In the columnar particle of FIG. 7 also, as long as the average growth direction of the columnar particle as a whole can be aligned parallel to the normal line direction of the current collector surface, the growth directions of the sub-particle layers may be inclined from the normal line direction of the current collector surface. In the columnar particle of FIG. 7, the growth direction of the first sub-particle layers 71 is a direction indicated by A, and the growth direction of the second sub-particle layers 72 is a direction indicated by B.

Figure 8:
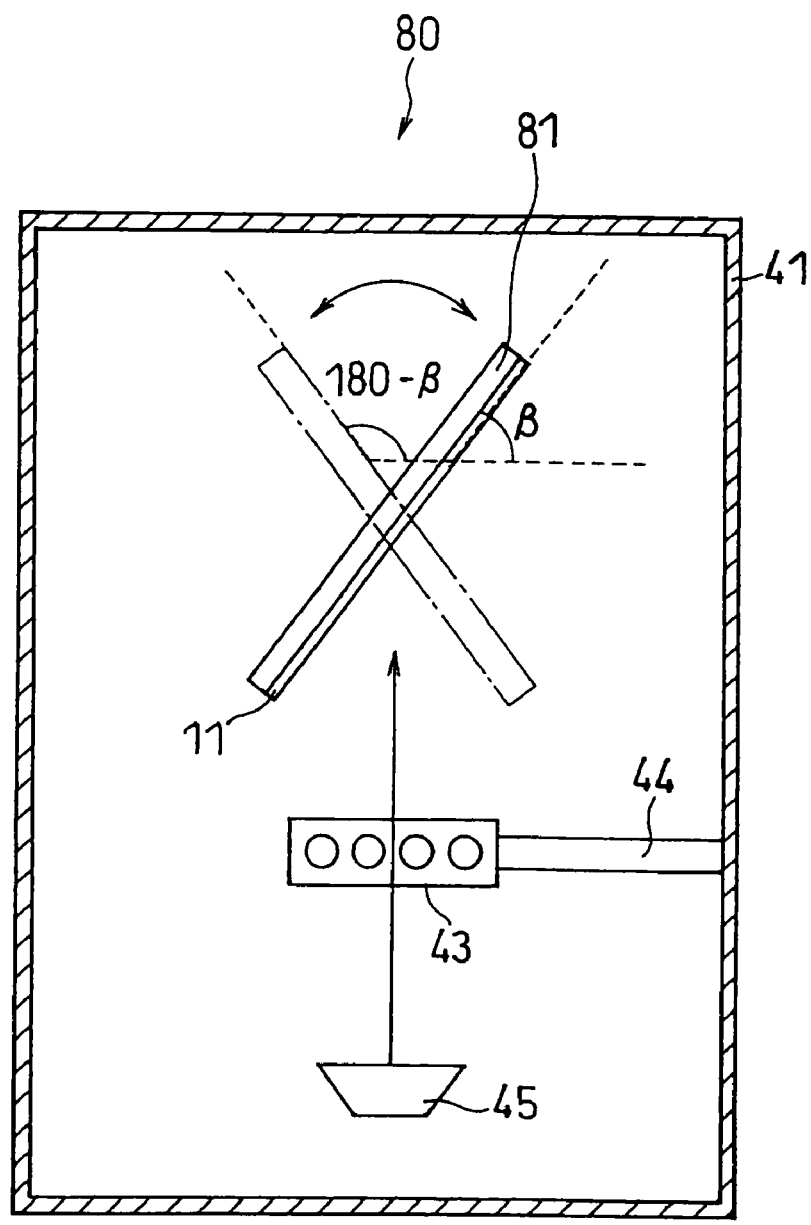
FIG. 8 is a schematic diagram of another example of an apparatus for producing a negative electrode active material layer.

A negative electrode active material layer including columnar particles as shown in FIG. 6 can be produced by using a vapor deposition apparatus 80 as shown in FIG. 8, for example. FIG. 8 is a side view schematically showing a configuration of a vapor deposition apparatus 80. In FIG. 8, the same reference numbers are given to the same components as those of FIG. 4, and a description thereof is omitted.

A holding table 81 which is a plate member is supported in an angular changeable or rotatable manner in a chamber 41, and the negative electrode current collector 11 is fixed onto one surface of the table in the thickness direction. The angle of the table 81 is changed between the position indicated by the solid line and the position indicated by the dash dotted line in FIG. 8. The position indicated by the solid line refers to a position (Position A) at which the surface of the holding table 81 on which the negative electrode current collector 11 is fixed faces a target 45 located vertically below the table, and the angle between the holding table 81 and a line in the horizontal direction is °. The position indicated by the dash dotted line refers to a position (Position B) at which the surface of the holding table 81 on which the negative electrode current collector 11 is fixed faces the target 45 located vertically below the table, and the angle between the holding table 81 and a line in the horizontal direction is (180-β)°. The angle β° can be selected appropriately according to the size of the negative electrode active material layer to be formed, or the like.

In the method for producing a negative electrode active material layer using the vapor deposition apparatus 80, the negative electrode current collector 11 is first fixed onto the holding table 81, and an oxygen gas is introduced into the chamber 41. In this condition, electron beams are irradiated to the target 45 to heat the target, generating vapor from the target. For example, when silicon is used as the target, the vaporized silicon passes through the oxygen atmosphere, and a silicon oxide is deposited onto the surface of the current collector. In this process, by arranging the holding table 81 to the position indicated by the solid line, the sub-particle layer 60a is formed on the protruding region as shown in FIG. 6.

Subsequently, by arranging the holding table 81 to the position indicated by the dash dotted line by changing the angle, the sub-particle layer 60b as shown in FIG. 6 is formed. By arranging the holding table 81 alternately to Positions A and B by changing the angle as just described, the columnar particles 60 having eight sub-particle layers as shown in FIG. 6 is formed.

The columnar particle shown in FIG. 7 also can be produced basically in the same manner as the columnar particle of FIG. 6 using the vapor deposition apparatus of FIG. 8. The columnar particle of FIG. 7 can be produced by, for example, using a shorter vapor deposition time for each of Positions A and B than that used for forming the columnar particle of FIG. 6, and increasing the number of sub-particle layers laminated.

With either of the above production methods, columnar particles can be formed at a predetermined spacing by arranging protrusions and recesses regularly on the current collector surface and forming an active material layer including a plurality of columnar particles in which silicon is contained on the current collector.

When the active material layer is formed only on one surface of the current collector, the surface portion that easily undergoes plastic deformation may be formed only on the surface of the substrate on which the active material layer is formed. It is also possible to form a surface portion that easily undergoes plastic deformation on each surface of the substrate, and form the active material layer on each surface portion.

It is also possible to produce an active material layer containing a silicon oxide by, in the above production method, using a silicon oxide as the target without an oxygen atmosphere between the current collector and the target, and allowing the silicon oxide to deposit onto the current collector.

It is also possible to allow a silicon nitride to deposit onto the current collector by using a nitrogen atmosphere instead of the oxygen atmosphere and a silicon simple substance as the target.

Further, active material particles made of silicon simple substance or active material particles made of a silicon alloy can be produced by using a silicon simple substance or material (including a mixture) containing elements that form a silicon alloy as the target, and vaporizing it in a vacuum in the above-described vapor deposition apparatus.

Incidentally, the negative electrode current collector included in a battery can be observed by removing the negative electrode active material layer from the negative electrode current collector. For example, a lithium ion secondary battery in a charged state is disassembled, and the negative electrode is taken out from the battery. Upon immersing the negative electrode in water, the lithium present in the negative electrode reacts rapidly with water, and the negative electrode active material detaches easily from the current collector. In other words, by immersing the negative electrode in a charged state in water, the active material can be removed easily from the current collector.

Figure 9:
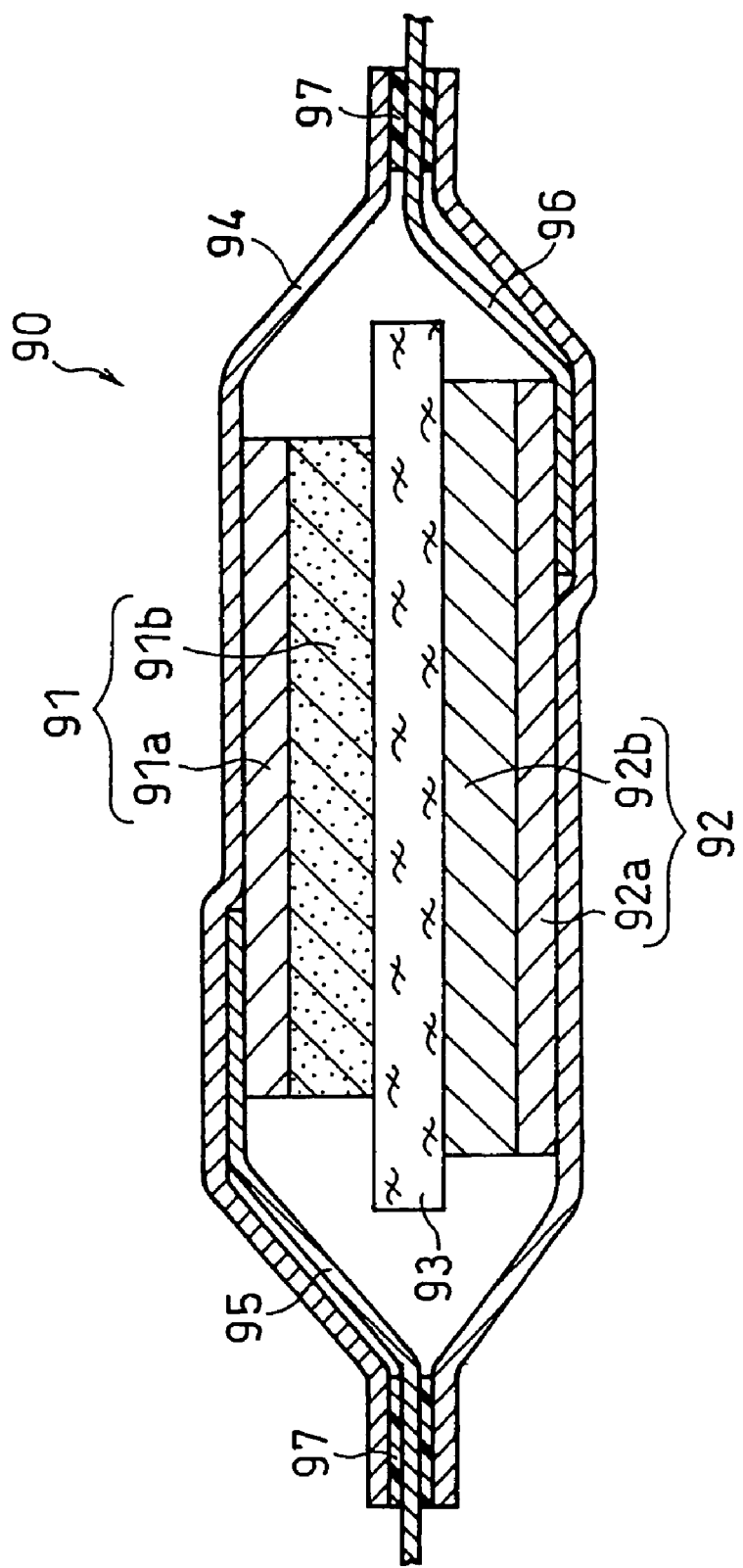
FIG. 9 is a vertical cross-sectional view schematically showing a lithium ion secondary battery according to an embodiment of the present invention.

The negative electrode as described above is used as a negative electrode for a lithium ion secondary battery. FIG. 9 shows a lithium ion secondary battery according to an embodiment of the present invention.

A battery 90 of FIG. 9 includes a laminated electrode group housed in a battery case 94 and an electrolyte (not shown). The electrode group includes a positive electrode 91, a negative electrode 92 and a separator 93 disposed between the positive electrode 91 and the negative electrode 92. The negative electrode 92 includes, as described above, a current collector 92a having a substrate and a surface portion with protrusions and recesses, and a negative electrode active material layer 92b. The negative electrode active material layer 92b includes a plurality of columnar negative electrode active material particles formed on the surface portion. In the battery of FIG. 9, the negative electrode active material layer is formed only on one surface of the negative electrode current collector.

The positive electrode 91 includes a positive electrode current collector 91a and a positive electrode active material layer 91b carried on one surface of the current collector.

One end of a negative electrode lead 96 is connected to the surface of the negative electrode current collector 92a on which no negative electrode active material layer is formed. One end of a positive electrode lead 95 is connected to the surface of the positive electrode current collector 91a on which no positive electrode active material layer is formed.

The battery case 94 has openings opposite to each other. The other end of the positive electrode lead 95 is drawn to the outside through one opening of the battery case 94, and the other end of the negative electrode lead 96 is drawn to the outside through the other opening of the battery case 94. The openings of the battery case 94 are hermetically sealed with a sealant 97.

As the material for the positive electrode current collector, any material known in the pertinent art can be used. An example of such a material is aluminum.

The positive electrode active material layer can include, for example, a positive electrode active material, a binder and a conductive material. As the positive electrode active material, and the binder and conductive material added to the positive electrode, any materials known in the pertinent art can be used. As the positive electrode active material, for example, a lithium-containing composite oxide such as lithium cobalt oxide can be used.

As the binder added to the positive electrode, for example, polytetrafluoroethylene or polyvinylidene fluoride can be used.

Examples of the conductive material added to the positive electrode include: graphites such as natural graphite (flake graphite and the like), artificial graphite and expanded graphite; carbon blacks such as acetylene black, ketjen black, channel black, furnace black, lamp black and thermal black; conductive fibers such as carbon fiber and metal fiber; metal powders such as copper powder and nickel powder; and organic conductive materials such as polyphenylene derivative. They may be used alone or in combination of two or more.

As the electrolyte, for example, a non-aqueous electrolyte containing a non-aqueous solvent and a solute dissolved in the solvent can be used. Examples of the non-aqueous solvent include, but are not limited thereto, ethylene carbonate, propylene carbonate, dimethyl carbonate, diethyl carbonate and methyl ethyl carbonate. These non-aqueous solvents may be used alone or in combination of two or more.

Examples of the solute include $LiPF_6$, $LiBF_4$, $LiClO_4$, $LiAlCl_4$, $LiSbF_6$, $LiSCN$, $LiCl$, $LiCF_3SO_3$, $LiCF_3CO_2$, $Li(CF_2SO_2)_2$, $LiAsF_6$, $LiN(CF_3SO_2)_2$, $LiB_{10}Cl_{10}$, and imides. They may be used alone or in combination of two or more.

As the material for the separator, any material known in the pertinent art can be used. Examples of the material include polyethylene, polypropylene, a mixture of polyethylene and polypropylene, a copolymer of ethylene and propylene.

The shape of the lithium ion secondary battery including the above-described negative electrode is not limited to a specific shape, and can be a coin-shaped, sheet-shaped or prismatic. The lithium ion secondary battery may be a large battery for use in electric vehicles and the like. The electrode group included in the lithium ion secondary battery of the present invention may be a laminated electrode group or spirally-wound electrode group.

EXAMPLES

Example 1

A laminated lithium ion secondary battery as shown in FIG. 9 was produced.

(i) Production of Positive Electrode

A positive electrode material mixture paste was prepared by sufficiently mixing 10g of a lithium cobalt oxide ($LiCoO_2$) powder having an average particle size of about 10 μM serving as a positive electrode active material, 0.3 g of acetylene black serving as a conductive material, 0.8 g of a polyvinylidene fluoride powder serving as a binder, and an appropriate amount of N-methyl-2-pyrrolidone (NMP).

The obtained paste was applied onto one surface of a 20 μm thick positive electrode current collector made of an aluminum foil, followed by drying and rolling to form a positive electrode active material layer. Subsequently, the obtained positive electrode sheet was cut into a predetermined shape to obtain a positive electrode. In the obtained positive electrode, the positive electrode active material layer carried on one surface of the aluminum foil had a thickness of 70 μm and a size of 30 mm×30 mm.

To the other surface of the positive electrode current collector having no positive electrode active material layer, one end of a positive electrode lead made of aluminum was connected.

(ii) Production of Negative Electrode

Using an apparatus including processing rollers for forming protrusions and recesses and backup rollers for supporting the processing rollers as shown in FIG. 1, a current collector including a substrate and a surface portion having protrusions and recesses was produced. As the processing rollers for forming protrusions and recesses, iron rollers having a chromium oxide layer with regularly formed pores were used. The chromium oxide layer was formed by thermal-spraying chromium oxide onto an iron roller. The pores were formed by laser processing. The diameter of the pores was set to 10 μm and the depth of the pores was set to 11 μm. The distance between the centers of adjacent pores was set to 20 μm.

As the substrate, a copper alloy foil (available from Hitachi Cable, Ltd) (thickness: 10 μm) was used in which an equal amount (0.2 wt %) of chromium, tin and zinc were incorporated in copper. As the surface portion, a rolled copper foil (available from Hitachi Cable, Ltd) (thickness: 10 μm) having a copper content of not less than 99.9 wt % was used.

The rolled copper foil was placed on each surface of the copper alloy foil. The obtained laminate was introduced between the processing rollers and then press-molded with a linear pressure of 2 t/cm. The copper alloy foil and the rolled copper foils were tightly attached to each other by the application of pressure, and at the same time, protrusions and recesses were formed in the rolled copper foils. Thereby, a current collector was obtained.

Figure 10:
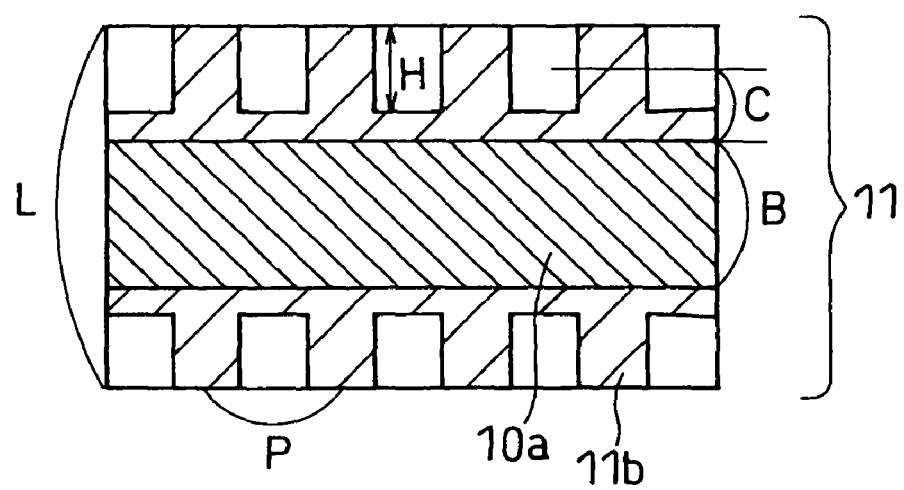
FIG. 10 is a vertical cross-sectional view schematically showing a current collector produced in EXAMPLE 1.

FIG. 10 shows a vertical cross-sectional view schematically showing the current collector produced in this example. In this example, columnar protrusions having a diameter of 10 μm were formed. Because the protrusions had a circular shape when viewed from a direction parallel to the normal line direction of the current collector surface, the center of gravity of the protrusions coincided with the center of the same. Accordingly, in this example, the distance P between adjacent protrusions was 20 μm.

The obtained current collector was cut, and protrusions were observed at ten different points by an electron microscope, the height difference between the protrusions and recesses was measured, and the average value was determined. As a result, the average height difference H between the protrusions and recesses was 8 μm.

The thickness B of the substrate included in the current collector was 10 μm, and the thickness C of the surface portion after protrusions and recesses were formed was 8 μm. As described above, the thickness C of the surface portions after protrusions and recesses are formed is a length between the average position of the height of the protrusions and recesses and the substrate-side end of the surface portion. The thickness of the surface portion was determined by measuring thickness at ten different points in the current collector, and averaging the measured values. This applies to the following examples.

The obtained current collector had a thickness L of 35 μm. As used herein, "the thickness L of the current collector" refers to an averaged value of the distances between protrusions on both surfaces, that is, an averaged value of the distances between the highest position of the protrusions formed on one surface of the current collector and the highest position of the protrusions formed on the other surface of the same. The thickness was measured at 10 different points in the current collector using a dial gauge, and the obtained average value was denoted as the thickness of the current collector.

Vickers hardness was measured for the copper alloy foil and the rolled copper foil using a Vickers hardness tester. As a result, the copper alloy foil was found to have a Vickers hardness of 250, and the rolled copper foil was found to have a Vickers hardness of 120.

Subsequently, a negative electrode was produced using a vapor deposition apparatus (available from ULVAC, Inc) including an electron beam heater (not shown) as shown in FIG. 4.

The nozzles that were provided in the vapor deposition apparatus injected an oxygen gas having a purity of 99.7% (available from Nippon Sanso Corporation) at a flow rate of 80 sccm. As a target, a silicon simple substance having a purity of 99.9999% (available from Kojundo Chemical Lab. Co., Ltd) was used.

The negative electrode current collector obtained as described above was cut into a size of 40 mm×40 mm. The cut-out negative electrode current collector having a size of 40 mm×40 mm and a thickness of 35 μm was fixed onto the holding table. The holding table was inclined to form an angle α of 60° with respect to the horizontal plane.

The accelerating voltage of electron beams irradiated to the target was set to −8 kV, and the emission current was set to 500 mA. The vapor of silicon simple substance passed through the oxygen atmosphere, and then deposited onto the surface portion of the negative electrode current collector fixed onto the holding table. The vapor deposition time was set to 22 minutes. In this manner, a negative electrode plate having a negative electrode active material layer including columnar silicon oxide particles on the negative electrode current collector was obtained. In the obtained negative electrode plate, the active material layer was formed only on one surface of the current collector. The thickness T of the active material layer was 17 μm.

The amount of oxygen contained in the negative electrode active material was quantified by a combustion method. As a result, the composition of the negative electrode active material containing silicon and oxygen was $SiO_{0.5}$.

The porosity of the negative electrode active material layer was determined as follows. In the obtained negative electrode plate, the area S of the region in which the negative electrode active material layer was formed was 961 mm² (31 mm×31 mm).

The weight W of the active material layer was determined by subtracting the weight of the negative electrode current collector from the weight of the obtained negative electrode plate. From the weight W of the active material layer and the density D of $SiO_{0.5}$ (2.3 g/cm³), the volume (W/D) of the active material layer was determined. The total space volume of the active material layer (S×T) was determined from the thickness T (17 μm) of the active material layer and the area S (961 mm²) of the region of the current collector carrying the active material layer. Using the obtained volume (W/D) of the active material layer and the total space volume of the active material layer (S×T), the porosity $P(=100[\{ST-(W/D)\}/ST])$ of the active material layer was determined. As a result, the porosity of the active material layer was 40%.

In the above calculation, the average value of the true density of Si (2.33 g/cm³) and the true density of SiO (2.24 g/cm³) was used as the density of $SiO_{0.5}$.

Subsequently, using a resistance heating vapor deposition apparatus (available from ULVAC, Inc), a lithium metal was deposited onto the obtained negative electrode plate in the following manner.

The negative electrode plate and a tantalum boat were placed in the vapor deposition apparatus, and a predetermined amount of lithium metal was loaded to the boat. The boat was fixed such that it faced the active material layer of the negative electrode plate.

The current value flowing through the boat was set to 50 A, and vapor deposition was performed for 10 minutes. By deposition of lithium metal onto the negative electrode as described above, lithium was supplied to the $SiO_{0.5}$ negative electrode active material to compensate for the irreversible capacity produced during the initial charge/discharge. The negative electrode plate on which lithium metal was deposited was cut into a size of 31 mm×31 mm. Thereby, Negative electrode 1A was obtained.

A negative electrode lead made of nickel was connected to the surface of the negative electrode current collector having no negative electrode active material layer.

(iii) Assembly of Battery

A separator made of a 20 μm thick polyethylene microporous film (available from Asahi Kasei Corporation) was disposed between the positive electrode and the negative electrode obtained above to produce a laminated electrode group. In this process, the positive electrode and the negative electrode were arranged such that the positive electrode active material layer and the negative electrode active material layer faced each other with the separator interposed therebetween.

The obtained electrode group was inserted, together with an electrolyte, into a battery case made of an aluminum laminate sheet.

The electrolyte was prepared by dissolving $LiPF_6$ in a solvent mixture of ethylene carbonate (EC) and ethyl methyl carbonate (EMC) mixed at a volume ratio of 1:1 at a $LiPF_6$ concentration of 1.0 mol/L.

After allowed to stand for a predetermined period of time, the electrolyte was impregnated into the positive electrode active material layer, the negative electrode active material layer and the separator. Thereafter, the positive electrode lead and the negative electrode lead were drawn to the outside respectively from the openings of the battery case that were located opposite to each other. In this condition, the both openings of the battery case were hermetically sealed using a sealant while reducing pressure to a vacuum condition in the battery case. Thereby, a battery was produced. The obtained battery was referred to as Battery 1A.

Comparative Example 1

Negative Electrode 1B

Only a copper alloy foil used in EXAMPLE 1 was used as a negative electrode current collector. Protrusions and recesses were formed in the copper alloy foil in the same manner as in EXAMPLE 1. The average height difference between the protrusions and recesses was 1 μm.

Negative electrode 1B was produced in the same manner as in EXAMPLE 1, except that the thus-obtained negative electrode current collector was used. Comparative battery 1B was produced in the same manner as in EXAMPLE 1, except that Negative electrode 1B was used.

Comparative Example 2

Negative Electrode 1C

Only a rolled copper foil used in EXAMPLE 1 was used as a negative electrode current collector. An attempt was made to form protrusions and recesses in the rolled copper foil in the same manner as in EXAMPLE 1. However, creases occurred in the rolled copper foil after it was passed through the processing rollers. For this reason, a conclusion was made that the use of only a rolled copper foil as a negative electrode current collector was inappropriate.

Table 1 shows the configuration of negative electrode current collector, the method for forming surface portion, the Vickers hardness of surface portion, the average height difference between protrusions and recesses, and the porosity of active material layer for Negative electrode 1A, Negative electrode 1B and Negative electrode 1C.

TABLE 1

| | Substrate | Surface portion | Method for forming surface portion | Vickers hardness of substrate | Vickers hardness of surface portion | Average height difference between protrusions and recesses (μm) | Porosity of active material layer (%) |
|---|---|---|---|---|---|---|---|
| Negative electrode 1A | Copper alloy foil | Rolled copper foil | Pressing | 250 | 120 | 8 | 40 |
| Negative electrode 1B | Copper alloy foil | — | — | 250 | — | 1 | 5 |
| Negative electrode 1C | Rolled copper foil | — | — | 120 | — | (Creases occurred) | — |

Evaluation Method
(i) Cycle Characteristics

First, Battery 1A and Comparative battery 1B each were housed in a thermostatic chamber set at 20° C., and then charged by the following constant current constant voltage method. Each battery was charged at a constant current of 1 C rate (1 C is a current value at which the entire battery capacity can be consumed in one hour) until the battery voltage reached 4.2 V. After the battery voltage reached 4.2 V, each battery was charged at a constant voltage of 4.2 V until the current value reached 0.05 C.

Subsequently, the charged battery was allowed to stand for 20 minutes, after which the battery was discharged at a constant current as high as 1 C rate until the battery voltage reached 2.5 V.

The charge/discharge cycle as described above was repeated 100 times.

The rate of the total discharge capacity at the 100th cycle to the total discharge capacity at the first cycle was determined in percentage. The obtained values are shown in the column labeled "Capacity retention rate" in Table 2.

The condition of the negative electrode after 100 cycles was visually checked. The results are shown in Table 2.

TABLE 2

| | Capacity retention rate (%) | Condition of negative electrode after 100 cycles |
|---|---|---|
| Battery 1A | 90 | No crease occurred in negative electrode |
| Comp. Battery 1B | 60 | Creases occurred in negative electrode Detachment of active material layer occurred |

As can be seen from Table 1, Negative electrode 1A had a large height difference between protrusions and recesses, and the active material layer had a high porosity of 40%. As can be seen from Table 2, Battery 1A exhibited an excellent capacity retention rate, and no crease occurred in the negative electrode of Battery 1A even after 100 cycles.

In Negative electrode 1A, the rolled copper foil, which easily undergoes plastic deformation, was disposed on the surfaces of the negative electrode current collector. Presumably, this allowed the formation of protrusions and recesses on the negative electrode current collector using the processing rollers, so a sufficient height difference between protrusions and recesses was obtained. For this reason, the distance between adjacent columnar particles was increased, leading to a high porosity. As a result, even when the active material layer expanded, no crease occurred in the negative electrode, and the columnar particles of the active material did not detach. From the above, Battery 1A including Negative electrode 1A is considered to have excellent cycle characteristics.

In contrast, Comparative battery 1B exhibited a small height difference between protrusions and recesses and a low porosity. The capacity retention rate of Comparative battery 1B was also low. After 100 cycles, creases occurred in the negative electrode, and detachment of the active material layer was also observed. Because the current collector surface of Comparative battery 1B was rigid, the height difference between the protrusions and recesses formed using the processing rollers was insufficient. This shortened the distance between adjacent columnar particles, resulting in a low porosity. As a result, it is presumed that the space for relieving the expansion of the active material layer was scarce, and thus creases occurred in the electrode plate and detachment of the active material layer occurred due to stress caused by the expansion of the active material layer.

Example 2

Negative electrodes 2A to 2E were produced in the same manner as in EXAMPLE 1, except that the method for forming a surface portion was changed as follows. Batteries 2A to 2E were produced in the same manner as in EXAMPLE 1, except that Negative electrodes 2A to 2E were used.

(i) Negative Electrode 2A

Negative electrode 2A was produced in the same manner as in EXAMPLE 1 except that, as a material for the surface portion, a copper foil was used which was obtained by heat treating a rolled copper foil used in EXAMPLE 1 at 200° C. in a vacuum for one hour. The heat treatment in a vacuum decreased Vickers hardness without changing the composition.

The Vickers hardness of the surface portion was measured by a Vickers hardness tester, and found to be 70. The average height difference between the protrusions and recesses of the current collector was 9 μm. The thickness of the surface portion after protrusions and recesses were formed was 8 μm.

(ii) Negative Electrode 2B

A negative electrode current collector was produced in the same manner as in EXAMPLE 1, except that a surface portion was formed by plating the surface of a copper alloy foil used as a substrate in EXAMPLE 1 with copper.

The production of the surface portion by plating method was performed as follows.

The copper alloy foil as a cathode was immersed in an electrolyte containing copper sulfate pentahydrate at a concentration of 270 g/L and sulfuric acid at a concentration of 100 g/L, and under the conditions of a current density of 5 A/dm$^2$ and an electrolyte temperature of 50° C., a copper layer serving as a surface portion was formed on the surface of the copper alloy foil. The surface portion had a copper content of not less than 99.9 wt %.

The Vickers hardness of the surface portion formed by the plating method was measured by a Vickers hardness tester, and found to be 160.

The average height difference between the protrusions and recesses of the current collector was 5 μm. The thickness of the surface portion after protrusions and recesses were formed was 8 μm.

Negative electrode 2B was produced in the same manner as in EXAMPLE 1, except that this current collector was used.

(iii) Negative Electrode 2C

A negative electrode current collector was produced in the same manner as in EXAMPLE 1, except that a surface portion was formed by depositing copper on the surface of a copper alloy foil serving as a substrate.

For the formation of the surface portion by a vapor deposition method, a vapor deposition apparatus (available from ULVAC, Inc) including an electron beam heater (not shown) as shown in FIG. 4 was used.

The copper alloy foil was fixed onto the holding table. The holding table was fixed to be horizontal (α=0°). A target to be deposited onto the copper alloy foil was placed vertically below the holding table. As the target, a copper simple substance having a purity of 99.9 wt % (available from Kojundo Chemical Lab. Co., Ltd) was used.

The accelerating voltage of electron beams irradiated to the target was set to −8 kV, and the emission current was set to 100 mA.

Upon irradiation of electron beams to the target, copper atoms were evaporated, and the evaporated copper atoms were deposited onto the copper alloy foil held on the holding table, forming a copper layer. The vapor deposition time was set to 20 minutes.

The surface portion had a copper content of not less than 99.9 wt %. The Vickers hardness of the surface portion formed by the vapor deposition method was measured by a Vickers hardness tester, and found to be 120.

The average height difference between the protrusions and recesses of the current collector was 8 μm. The thickness of the surface portion after protrusions and recesses were formed was 8 μm.

Negative electrode 2C was produced in the same manner as in EXAMPLE 1, except that this current collector was used.

(iv) Negative Electrode 2D

A negative electrode current collector was produced in the same manner as in EXAMPLE 1, except that a surface portion was formed by roughening the surface of a copper alloy foil serving as a substrate with an etching solution.

As the etching solution, a partial etching solution (available from MEC Co. Ltd.) was used. The etching solution was held at a temperature of 35° C., and the etching time was set to 30 seconds. The copper alloy foil after etching had a surface roughness Ra of 1.5 μm.

The Vickers hardness of the surface portion formed by the etching method was measured by a Vickers hardness tester, and found to be 200. The average height difference between the protrusions and recesses of the current collector was 3 μm.

Negative electrode 2D was produced in the same manner as in EXAMPLE 1, except that this current collector was used.

100 g/L, and under the conditions of a current density of 3 A/dm$^2$ and an electrolyte temperature of 50° C., the surface portion was plated with copper. This copper plating improved the adhesion strength of the surface portion to the copper alloy foil. The surface portion after the copper plating had a thickness of 10 μm.

The median diameter of the copper particles formed by the electrodeposition was 2 μm.

The surface portion before protrusions and recesses were formed had a surface roughness Ra of 2 μm. The Vickers hardness of the surface portion formed by the electrodeposition method was measured by a Vickers hardness tester, and found to be 90.

The average height difference between the protrusions and recesses of the current collector after protrusions and recesses were formed was 9 μm. The thickness of the surface portion after protrusions and recesses were formed was 8 μm.

Negative electrode 2E was produced in the same manner as in EXAMPLE 1, except that this current collector was used.

Table 3 shows the type of surface portion, the formation method of the surface portion, the Vickers hardness of the surface portion, the average height difference between protrusions and recesses and the porosity of active material layer for Negative electrodes 2A to 2E. In Negative electrodes 2A, 2B, 2C and 2E, the substrate in the formed current collector had a thickness of 10 μm. In Negative electrode 2D, the thickness of the current collector after protrusions and recesses were formed was 30 μm. Additionally, the thickness of the copper alloy foil before etching was 26 μm.

TABLE 3

| | Substrate | Type of Surface portion (Formation method) | Vickers hardness of surface portion | Average height difference between protrusions and recesses (μm) | Porosity of active material layer (%) |
|---|---|---|---|---|---|
| Negative electrode 2A | Copper alloy foil | Copper layer (Pressing of heat-treated rolled copper foil) | 70 | 9 | 45 |
| Negative electrode 2B | Copper alloy foil | Copper layer (Plating) | 160 | 5 | 30 |
| Negative electrode 2C | Copper alloy foil | Copper layer (Vapor deposition) | 120 | 8 | 40 |
| Negative electrode 2D | Copper alloy foil | Porous layer (Etching of substrate) | 200 | 3 | 20 |
| Negative electrode 2E | Copper alloy foil | Porous layer (Electrodeposition) | 90 | 9 | 44 |

(v) Negative Electrode 2E

A negative electrode current collector was produced in the same manner as in EXAMPLE 1, except that a porous surface portion was formed on the surface of a copper alloy foil serving as a substrate by electrodeposition.

The surface portion was formed as follows.

The copper alloy foil as a cathode was immersed in an electrolyte containing copper sulfate pentahydrate at a concentration of 47 g/L and sulfuric acid at a concentration of 100 g/L, and under the conditions of a current density of 30 A/dm$^2$ and an electrolyte temperature of 50° C., a large number of copper particles were formed on the copper alloy foil to form a porous surface portion. Further, the current collector on which the surface portion was formed was immersed in an electrolyte containing copper sulfate pentahydrate at a concentration of 235 g/L and sulfuric acid at a concentration of Capacity retention rate was determined for Batteries 2A to 2E in the same manner as in EXAMPLE 1. The results are shown in Table 4.

TABLE 4

| | Capacity retention rate (%) |
|---|---|
| Battery 2A | 93 |
| Battery 2B | 80 |
| Battery 2C | 90 |
| Battery 2D | 75 |
| Battery 2E | 92 |

As can be seen from Table 3, the surface portions obtained by the formation methods performed in this example exhibited a Vickers hardness of 200 or lower, indicating that they have excellent workability. For this reason, the average height difference between the protrusions and recesses formed on the surface portions was high. The negative electrode active material layers formed on these current collectors had a porosity of 20% or greater.

As can be seen from Table 4, Batteries 2A to 2E exhibited a capacity retention rate of 75% or greater. Further, the batteries were disassembled after the cycle test so as to observe the condition of the negative electrodes. As a result, it was found that the occurrence of creases in the electrode plates and the detachment of the active material were suppressed.

In Negative electrodes 3A and 3B, the material for forming the substrate was subjected to a blast treatment using alumina ($Al_2O_3$) particles. By this blast treatment, the surface of the material for forming the substrate was roughened to improve the adhesion strength between the material for forming the substrate and the material for forming the surface portion.

Table 5 shows the shows the type of substrate, the type of surface portion, the formation method of the surface portion, the Vickers hardness of the surface portion, the average height difference between protrusions and recesses and the porosity of active material layer for Negative electrodes 3A and 3B.

TABLE 5

|  | Substrate | Type of surface portion (Formation method) | Vickers hardness of surface portion | Average height difference between protrusions and recesses (μm) | Porosity of active material layer (%) |
| --- | --- | --- | --- | --- | --- |
| Negative electrode 3A | Ni foil | Copper layer (Pressing of copper foil) | 120 | 7 | 38 |
| Negative electrode 3B | Stainless steel foil | Copper layer (Pressing of copper foil) | 120 | 7 | 38 |

This is presumably because the active material layers had a porosity of 20% or greater as described above, so the stress caused by the expansion of the active material layers was sufficiently relieved, which suppressed the occurrence of creases in the electrode plates and the detachment of the active material, and thus excellent capacity retention rates were obtained.

Example 3

Negative electrodes 3A to 3B were produced in the same manner as in EXAMPLE 1, except that the type of substrate for a negative electrode current collector was changed as follows. Batteries 3A to 3B were produced in the same manner as in EXAMPLE 1, except that Negative electrodes 3A to 3B were used.
(i) Negative Electrode 3A Negative electrode 3A was produced in the same manner as in EXAMPLE 1, except that a 18 μm thick nickel foil (Vickers hardness: 300) was used as a substrate. Battery 3A was produced in the same manner as in EXAMPLE 1 using Negative electrode 3A. Because the surface portion was the same as that of EXAMPLE 1, the surface portion had a Vickers hardness of 120. The average height difference between the protrusions and recesses of the current collector was 7 μm. The thickness of the surface portion after protrusions and recesses were formed was 8 μm.
(ii) Negative Electrode 3B Negative electrode 3B was produced in the same manner as in EXAMPLE 1, except that a 18 μm thick stainless steel foil (Vickers hardness: 200) was used as a substrate. Battery 3B was produced in the same manner as in EXAMPLE 1 using Negative electrode 3B. Because the surface portion was the same as that of EXAMPLE 1, the surface portion had a Vickers hardness of 120. The average height difference between the protrusions and recesses of the current collector was 7 μm. The thickness of the surface portion after protrusions and recesses were formed was 8 μm.

In the current collectors used in Negative electrodes 3A and 3B, the substrates had a thickness of 18 μm.

Capacity retention rate was determined for Batteries 3A and 3B in the same manner as in EXAMPLE 1. The results are shown in Table 6.

TABLE 6

|  | Capacity retention rate (%) |
| --- | --- |
| Battery 3A | 90 |
| Battery 3B | 89 |

In both cases where the substrate was a nickel foil and where the substrate was a stainless steel foil, no creases were formed in the current collector during the process in which protrusions and recesses were formed on the surface portion.

Also, the results of Table 6 indicate that excellent cycle characteristics are obtained regardless of whether the substrate is a nickel foil or stainless steel foil.

Example 4

Negative electrodes 4A to 4C were produced using silicon alloys and a silicon compound produced in the following procedure as negative electrode active materials. Batteries 4A to 4C were produced in the same manner as in EXAMPLE 1, except that Negative electrodes 4A to 4C were used. As the metal elements M contained in the silicon alloys other than silicon, Ti (Negative electrode 4A) and Cu (Negative electrode 4B) that do not form an alloy with lithium were used. In the silicon compound (Negative electrode 4C), nitrogen was incorporated as an element other than silicon.
(i) Negative Electrode 4A For the formation of a negative electrode active material layer, as a target, a mixture of Si powder (available from Kojundo Chemical Lab. Co., Ltd) and $TiSi_2$ powder (available from Kojundo Chemical Lab. Co., Ltd) ($Si:TiSi_2$=3:1 (molar ratio)) was used. The angle α between the holding table and the horizontal plane was set to 60°. The vapor deposition time was set to 25 minutes. The flow rate of oxygen gas was set to 0 sccm. Negative electrode 4A was produced in the same manner as in EXAMPLE 1 except for the above procedure.

The elements contained in the obtained active material layer was quantified by X-ray fluorescence spectrometry. As a result, the composition of the formed silicon alloy was $SiTi_{0.2}$.

(ii) Negative Electrode 4B

For the formation of a negative electrode active material layer, as a target, a mixture of Si powder (available from Kojundo Chemical Lab. Co., Ltd) and Cu powder (available from Kojundo Chemical Lab. Co., Ltd) (Si:Cu=5:1(molar ratio)) was used. The angle α between the holding table and the horizontal plane was set to 60°. The vapor deposition time was set to 25 minutes. The flow rate of oxygen gas was set to 0 sccm. Negative electrode 4B was produced in the same manner as in EXAMPLE 1 except for the above procedure.

The elements contained in the obtained active material layer was quantified by X-ray fluorescence spectrometry. As a result, the composition of the formed silicon alloy was $SiCu_{0.2}$.

(iii) Negative Electrode 4C

For the formation of a negative electrode active material layer, as a target, monocrystalline silicon (available from Kojundo Chemical Lab. Co., Ltd) was used. Instead of the oxygen gas, a nitrogen gas was introduced into the chamber. The accelerating voltage of electron beams irradiated to the target was set to −8 kV, and the emission current was set to 300 mA. The angle α between the holding table and the horizontal plane was set to 60°, and the vapor deposition time was set to 40 minutes. Negative electrode 4C was produced in the same manner as in EXAMPLE 1 except for the above procedure.

As the nitrogen gas, a nitrogen gas having a purity of 99.7% (available from Nippon Sanso Corporation) was used, and the flow rate of the nitrogen gas was set to 20 sccm. An electron beam irradiating device was installed near the nozzles to convert the nitrogen gas to a plasma. In the electron beam irradiating device, the accelerating voltage was set to −4 kV, and the emission current was set to 20 mA.

The elements contained in the obtained active material layer was quantified by X-ray fluorescence spectrometry. As a result, the composition of the compound containing silicon and nitrogen was $SiN_{0.2}$.

The negative electrode active material layers included in Negative electrodes 4A to 4C had a porosity of 40%.

Capacity retention rate was determined for Batteries 4A to 4C in the same manner as in EXAMPLE 1. The results are shown in Table 7.

TABLE 7

|  | Capacity retention rate (%) |
| --- | --- |
| Battery 4A | 81 |
| Battery 4B | 82 |
| Battery 4C | 86 |

The result of Battery 4A indicates that even when an alloy containing silicon and titanium is used as an active material, an excellent capacity retention rate can be obtained. The result of Battery 4B indicates that even when an alloy containing silicon and copper is used as an active material, an excellent capacity retention rate can be obtained.

The result of Battery 4C indicates that even when a compound containing silicon and nitrogen is used as an active material, an excellent capacity retention rate can be obtained.

Example 5

Negative electrode 5A was produced in the same manner as in EXAMPLE 1, except that a negative electrode active material layer was formed as follows. Lithium was deposited on the active material layer in the same manner as in EXAMPLE 1.

Battery 5A was produced in the same manner as in EXAMPLE 1, except that Negative electrode 5A was used.

(Formation of Negative Electrode Active Material Layer)

A negative electrode active material layer including columnar particles as shown in FIG. 6 was formed using a negative electrode current collector used in Negative electrode 2E of EXAMPLE 2, and a vapor deposition apparatus of FIG. 8.

The thus-obtained negative electrode current collector was fixed onto the holding table 81. The holding table 81 was inclined to form an angle β of 60° with respect to the horizontal plane (Position A).

The accelerating voltage of electron beams irradiated to a silicon simple substance serving as a target 45 was set to −8 kV, and the emission current was set to 500 mA. The flow rate of oxygen gas injected from the nozzles was set to 80 sccm. Silicon and oxygen were deposited onto the current collector held on the holding table 81 so as to form a first sub-particle layer 60a on the protrusions. The vapor deposition time was set to 2 minutes and 30 seconds.

Subsequently, the holding table 81 was inclined to form an angle of 120° (i.e., (180−β)°) with respect to the horizontal plane as shown in FIG. 8 (Position B). Under the same conditions as in the case of the first sub-particle layer, a second sub-particle layer 60b was formed on the first sub-particle layer 60a. By changing the position of the holding table alternately to Position A and Position B as described above, columnar particles each including a laminate of eight sub-particle layers were formed. The negative electrode thus obtained was referred to as Negative electrode 5A.

The negative electrode active material layer had a thickness T of 16 μm. The amount of oxygen contained in the negative electrode active material layer was quantified by a combustion method. As a result, the composition of the negative electrode active material was $SiO_{0.5}$. The porosity of the negative electrode active material layer was determined in the same manner as in EXAMPLE 1, and found to be 46%.

Capacity retention rate was determined for Battery 5A in the same manner as in EXAMPLE 1. Negative electrode 5A was visually checked after being cycled 100 times. The results are shown in Table 8.

TABLE 8

|  | Capacity retention rate (%) | Condition of negative electrode after 100 cycles |
| --- | --- | --- |
| Battery 5A | 93 | No crease occurred in negative electrode |

Even when the negative electrode active material layer included a columnar particle made up of a plurality of parts formed by the oblique deposition, similarly to Battery 2E of EXAMPLE 2, the occurrence of crease was suppressed, and excellent cycle characteristics were obtained. Presumably, this is because a space was created around the columnar particle, and thus the expansion of the active material was absorbed into the space, and collision between adjacent columnar particles was avoided.

Further, an improvement was observed in the capacity retention rate of Battery 5A as compared with that of Battery 2E. In the case of the columnar particle produced in this example whose growth direction is parallel to the normal line direction of the current collector surface, the stress of the interface that occurs when expanded can be reduced as compared with the case of a columnar particle whose growth direction is inclined with respect to the normal line direction of the current collector surface. Presumably for this reason, although the thickness of the active material layer was large, the occurrence of crease in the current collector was suppressed, and capacity retention rate was improved.

In the present invention, because a layer that easily undergoes plastic deformation is positioned at the surface of a current collector, protrusions and recesses can be formed easily on the current collector surface. For this reason, according to the present invention, it is possible to provide a lithium ion secondary battery having a high capacity and excellent cycle characteristics. Such a lithium ion secondary battery can be used as, for example, a power source for portable electronic devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery comprising a sheet-like current collector and an active material layer carried on the current collector,
   wherein said current collector comprises a substrate and a surface portion that undergoes plastic deformation more easily than said substrate, said surface portion having protrusions and recesses arranged at equal distances thereon, and
   said active material layer comprises a plurality of columnar particles containing silicon, said columnar particles being carried on said surface portion.

2. The negative electrode for a lithium ion secondary battery in accordance with claim 1, wherein said surface portion has a hardness lower than that of said substrate.

3. The negative electrode for a lithium ion secondary battery in accordance with claim 2,
   wherein said substrate and said surface portion contain copper, and
   the concentration of copper contained in said surface portion is higher than the concentration of copper contained in said substrate.

4. The negative electrode for a lithium ion secondary battery in accordance with claim 3, wherein said surface portion comprises a copper foil of high purity attached by pressure onto the surface of said substrate.

5. The negative electrode for a lithium ion secondary battery in accordance with claim 3, wherein said surface portion is formed by plating the surface of said substrate with copper.

6. The negative electrode for a lithium ion secondary battery in accordance with claim 3, wherein said surface portion is formed by vapor deposition of copper on the surface of said substrate.

7. The negative electrode for a lithium ion secondary battery in accordance with claim 1, wherein said surface portion is porous.

8. The negative electrode for a lithium ion secondary battery in accordance with claim 7, wherein said surface portion is formed by etching said substrate.

9. The negative electrode for a lithium ion secondary battery in accordance with claim 7, wherein said surface portion is formed by electrodeposition of copper on the surface of said substrate.

10. The negative electrode for a lithium ion secondary battery in accordance with claim 7,
    wherein said substrate and said surface portion contain copper, and
    the concentration of copper contained in said surface portion is higher than the concentration of copper contained in said substrate.

11. The negative electrode for a lithium ion secondary battery in accordance with claim 1, wherein said columnar particles each comprise a laminate of a plurality of sub-particle layers that is grown and inclined with respect to a normal line direction of the surface of said current collector.

12. The negative electrode for a lithium ion secondary battery in accordance with claim 11, wherein the growth directions of said plurality of sub-particle layers included in said laminate are inclined alternately in a first direction and a second direction with respect to the normal line direction of the surface of said current collector.

13. A lithium ion secondary battery comprising: an electrode group including a positive electrode capable of absorbing and desorbing lithium ions, the negative electrode in accordance with claim 1, and a separator disposed between said positive electrode and said negative electrode; an electrolyte having lithium ion conductivity; and a battery case that houses said electrode group and said electrolyte.

14. The negative electrode for a lithium ion secondary battery in accordance with claim 1, wherein said protrusions and recesses are arranged only on said surface portion, and said substrate is smooth.

15. The negative electrode for a lithium ion secondary battery in accordance with claim 1, wherein said substrate comprises a copper alloy foil, and said surface portion comprises a rolled copper foil.

16. The negative electrode for a lithium ion secondary battery in accordance with claim 1, wherein the distance between said protrusions adjacent to each other is 5 to 50 μm.

17. The negative electrode for a lithium ion secondary battery in accordance with claim 1, wherein the average height difference between said protrusions and said recesses is 1 to 15 μm.

18. The negative electrode for a lithium ion secondary battery in accordance with claim 1, wherein the average height difference between said protrusions and said recesses is 3 to 15 μm.

19. The negative electrode for a lithium ion secondary battery in accordance with claim 1, wherein the average height difference between said protrusions and said recesses is 3 to 10 μm.

* * * * *